United States Patent
Hammond

[11] 3,714,702
[45] Feb. 6, 1973

[54] METHOD FOR DIFFUSION BONDING REFRACTORY METALS AND ALLOYS

[75] Inventor: Joseph P. Hammond, Knoxville, Tenn.

[73] Assignee: The United States of America as represented by the United States Atomic Energy Commission

[22] Filed: Aug. 17, 1971

[21] Appl. No.: 172,533

[52] U.S. Cl. ........................29/494, 29/498, 29/504
[51] Int. Cl. ........................B23k 31/02, B23k 35/38
[58] Field of Search...............29/494, 498, 501, 504

[56] References Cited

UNITED STATES PATENTS

| | | | |
|---|---|---|---|
| 3,170,234 | 2/1965 | Torr | 29/501 X |
| 3,197,858 | 8/1965 | Fedusko et al. | 29/498 X |
| 3,241,230 | 3/1966 | Batista et al. | 29/494 |
| 3,431,615 | 3/1969 | Hogodom et al. | 29/498 X |
| 3,478,415 | 11/1969 | Selmon | 29/498 X |

*Primary Examiner*—J. Spencer Overholser
*Assistant Examiner*—Ronald J. Shore
*Attorney*—Roland A. Anderson

[57] ABSTRACT

An improvement in the method of diffusion-bonding articles comprised of refractory metals or alloy combinations thereof. The customary intermediate placed between the articles to promote bonding is modified by incorporating therein a dispersion of fine particles which at the bonding temperature are chemically and physically stable and substantially non-reactive and non-coherent with the intermediate. The dispersed particles are selected to be essentially mutually insoluble with the intermediate. The high-energy boundaries provided by the dispersed particles act as inexhaustible sinks for lattice vacancies in the matrix metal or alloy, thus suppressing the formation of Kirkendall voids in the interlayer between the articles.

7 Claims, 4 Drawing Figures

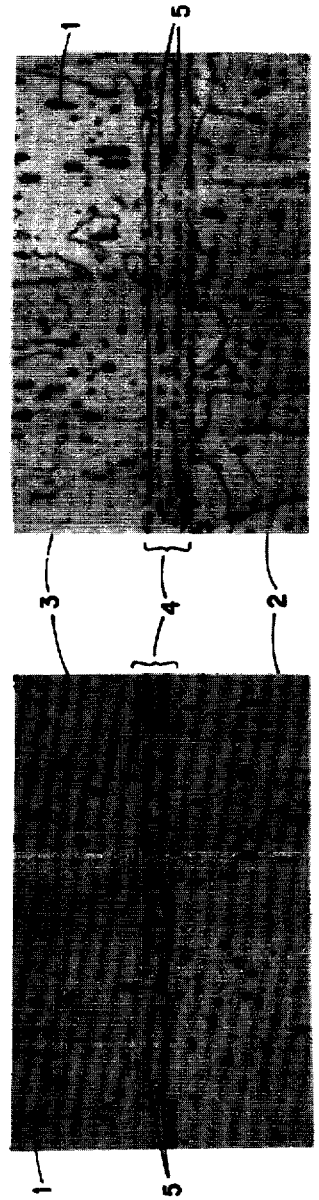
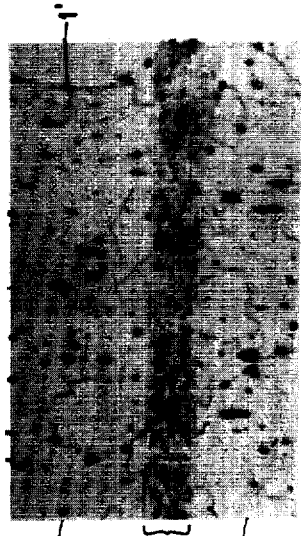
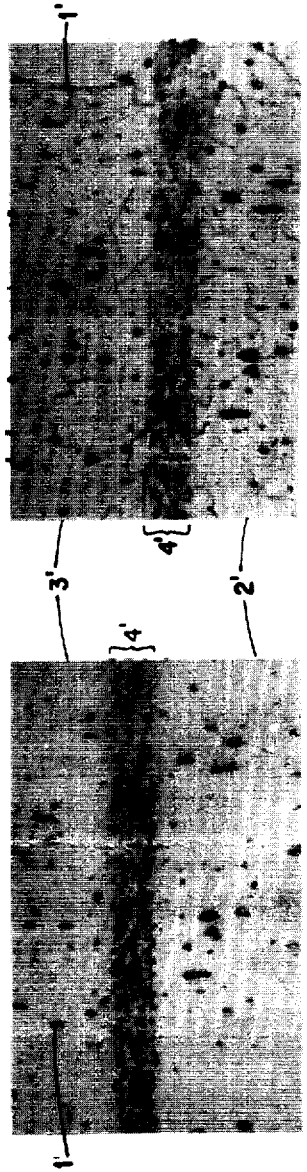

3,714,702

METHOD FOR DIFFUSION BONDING REFRACTORY METALS AND ALLOYS

BACKGROUND OF THE INVENTION

This invention was made in the course of, or under, a contract with the United States Atomic Energy Commission.

This invention relates broadly to the joining of refractory metals and alloys thereof. More particularly, it relates to an improved method for the diffusion bonding of tungsten, tantalum, rhenium, columbium, molybdenum, and alloy combinations thereof.

The increasing industrial use of refractory metals and alloys— materials having a melting point above about 2,500°C—has led to increased interest in methods for producing sound joints of the same. The desired joints must be characterized by a high melting point and working temperature, and this requirement rules out the use of normal brazing techniques. Consequently, much attention has been given to joining refractory metals and alloys by diffusion bonding, a method of joining which in many applications effects excellent bonding with a minimum of mass transport or movement of parts and at a temperature lower than the fusion temperature of the metallic members being joined.

It is known that the diffusion bonding of refractory metals and alloys often can be facilitated by interposing a carefully selected intermediate between the articles to be joined. The intermediate is a metal- or alloy-containing material which is more deformable than the articles and which has a lower melting point than the articles. It may take various forms—such as a foil, a powder coating, or an electroplating. The intermediate often is a fast-diffusing material which promotes interdiffusion during bonding. Also, it may be a material which is a solvent for undesired films on the surfaces to be bonded.

The use of a carefully selected intermediate does not necessarily result in a joint of high stability or strength. For example, in the diffusion bonding of some articles, such as those composed of tungsten, the material used as the intermediate diffuses through the article-to-intermediate interface at a faster rate than the tungsten. The resulting imbalance in the rates of migration across the interface results in vacancies in the lattice of the intermediate. Such vacancies are produced not only in the course of the bonding operation but also during subsequent high-temperature use of the bonded joint. When the density of the lattice vacancies becomes relatively large, they cluster, or nucleate, forming voids in the interlayer portion of the joint. The formation of such voids commonly is referred to as the Kirkendall effect. The Kirkendall effect may appreciably weaken the interlayer, with the result that the joint produced by diffusion bonding may fail when subjected to comparatively low stresses, especially shearing stresses.

Kirkendall voids are formed to some extent whenever an intermediate is used to promote the diffusion bonding of materials which during bonding diffuse at a slower rate than the intermediate. The severity of the problem increases with the difference in the rates of diffusion. Kirkendall void formation is especially serious where intermediates are used for the bonding of refractory metals or alloys, since these materials are characterized by comparatively low rates of diffusion at diffusion-bonding temperatures.

SUMMARY OF THE INVENTION

It is, therefore, an object of this invention to provide an improvement in the method of diffusion-bonding refractory metals and alloys by means of intermediates.

It is another object to provide an improved method of the kind described which produces bonds having enhanced strength and stability.

It is another object to provide an improved method of the kind described which produces bonds characterized by a low order of Kirkendall void formation.

Other objects of the invention will be evident from the description which follows.

BRIEF DESCRIPTION OF THE FIGURES

FIG. 1 is a photomicrograph (1000X) showing in section a joint produced in the conventional manner by diffusion-bonding thoriated tungsten parts with a 2-micron tantalum foil intermediate. The joint is shown in the as-polished condition.

FIG. 2 is a similar view (1000X) of a joint produced in the conventional manner by diffusion-bonding thoriated tungsten parts with a 6-micron tantalum foil intermediate. The joint is shown in the as-etched condition.

FIG. 3 is a similar view (1000X) of a joint produced in accordance with this invention by diffusion bonding thoriated tungsten parts and a special intermediate. The joint is shown in the as-polished condition.

FIG. 4 is a similar view of the joint shown in FIG. 3, after etching.

DESCRIPTION OF THE PREFERRED EMBODIMENT

FIGS. 1 and 2 are illustrations of the problem which is solved by my improved method for diffusion bonding. FIG. 1 shows the kind of joint which results when thoriated tungsten articles are diffusion bonded in the conventional manner with a 3-micron-thick tantalum foil intermediate. The joint shown in FIG. 1 was obtained by bonding in a vacuum furnace (at $10^{-6}$ Torr) at a pressure of 20 tsi (tons per square inch) and a temperature of 1,700°C for 20 hours. The joint is shown in the as-polished condition. As shown, thorium-oxide particles 1 are dispersed throughout the thoriated-tungsten articles 2 and 3. The interlayer 4 contains numerous voids 5 resulting from the above-mentioned Kirkendall effect. These voids, resulting from the clustering of vacancies produced in the tantalum lattice by an imbalance in the rates of diffusion of tungsten and tantalum, seriously impair the quality of the joint.

FIG. 2 shows an as-etched joint produced by the same bonding conditions as employed for the bond of FIG. 1 but with a thicker (6-micron) tantalum foil as the intermediate. Again, numerous Kirkendall voids 5 have formed in the interlayer 4 disposed between the thoriated-tungsten parts 2 and 3.

I have found that the formation of Kirkendall voids can be markedly reduced or virtually eliminated by incorporating in the intermediate metal or alloy a dispersion of what will be referred to herein as inert particles. Thus, in my improved method, diffusion bonding is conducted with an intermediate which consists entirely or largely of a matrix metal or alloy containing an inert particulate dispersion. The term "inert particulate dispersion" is used herein to refer to a dispersion in the matrix of fine particles which at diffusion-bonding temperature are chemically and physically stable and and are substantially non-reactive and non-coherent with the matrix. The term "non-coherent" is used to refer to a mismatch of atoms across the interfacial boundary separating the particle from the matrix. An additional criterion is that the dispersed particles and the matrix be essentially mutually insoluble.

An inert particulate dispersion meeting the criteria given above is characterized by high-energy boundaries which, I have found, act as essentially inexhaustible sinks for lattice vacancies in the matrix metal or alloy. That is, the boundaries of the dispersed particles dissipate lattice vacancies. As a result, the usual clustering of vacancies is suppressed and thus the extent of Kirkendall voids formed in the bonding region is markedly reduced.

The size of the above-mentioned inert dispersed particles and the average inter-particle spacing in the matrix are not highly critical, in the sense that some reduction in Kirkendall void formation is effected if only a moderate quantity of particles of comparatively large diameter are dispersed in the matrix. Best results are obtained, however, if the particles are very small and the quantity large, so as to provide readily available boundaries for dissipating vacancies as they are formed. It is not inconsistent to provide particle boundaries for vacancy dissipation while at the same time strengthening the intermediate by the mechanism of fine-particle dispersion hardening. The inter-particle spacing believed to be optimum for dispersion hardening is between 0.2 and 0.5 micron, and the particle size about 0.1 micron and smaller. To provide vacancy sinks, in accordance with this invention, the average particle size may range from about 0.05 to 1.0 micron, with the average spacing ranging from about 0.2 to 2.0 microns. Still larger particles will provide effective vacancies, but their use tends to reduce the mechanical quality of the joint.

Various well-known techniques can be employed to form the special intermediate containing the desired dispersion. In many instances the intermediate can be formed by mechanically blending a very fine metal matrix powder with an extremely fine inert powder and then compressing and/or mill-rolling the resulting blend to form a compacted sheet suitable for mounting between the articles to be diffusion bonded. Alternatively, the constituent powders may be wet-blended by stirring or ball-milling to form a homogeneous slurry which is then applied to one or more of the surfaces to be joined. A third method of preparation is described in U.S. Pat. No. 3,271,142, which teaches the fabrication of dispersion-hardened compacts or sheets containing a reactive metal oxide uniformly dispersed within a matrix metal or alloy selected from tungsten, molybdenum, and rhenium. In some instances the desired inert particulate dispersion may be formed in the matrix metal or alloy in the course of the diffusion-bonding operation by chemical reaction, as will be illustrated in detail hereinafter.

My improved method is illustrated below as applied to the diffusion bonding of thoriated-tungsten parts, using an intermediate comprising tantalum containing a dispersion of ultrafine tantalum carbide. In this example, the bonding time and temperature were selected to conform to those used in producing the bonds shown in FIGS. 1 and 2, and are not necessarily the optimum values.

Example

Oxide-reduced tantalum powder (-325 mesh) was ball-milled with approximately 1 wt-% ultrafine carbon (average particle diameter, about 0.03 micron). Ball-milling was conducted for 48 hours with tungsten carbide balls and with petroleum ether as a milling lubricant. The resulting powder mixture was placed in the protective atmosphere of an argon-filled vacuum dry box while permitting the ether to evaporate. After evaporation of the ether, the powder was mixed with an acrylic resin solution to form a homogeneous slurry. The slurry was applied as a coating to the faying surfaces of the thoriated-tungsten parts to be joined, and the parts so coated were diffusion-bonded in a vacuum furnace ($10^{-6}$ Torr) at 1,700°C under a pressure of 20,000 psi for 20 hours. During heating, the acrylic resin portion of the coating was volatilized off as the parts were diffusion-bonded together. The above-mentioned dispersion of ultrafine carbon particles reacted with the tantalum matrix metal to form a fine dispersion of tantalum carbide ($Ta_2C$). The average particle diameter of the $Ta_2C$ particles was approximately 0.75 micron and the average inter-particle spacing about 1 micron, as determined by metallographic measurement.

The resulting joint is shown in FIG. 3 (magnification, 1,000). As shown, the interlayer 4' between the thoriated-tungsten parts 2' and 3' contains no discernible voids but rather a fine dispersion of $Ta_2C$ particles. That is, the inert particulate dispersion formed in the course of the bonding operation provided sufficient high-energy boundaries to dissipate the vacancies produced in the tantalum lattice as a result of the imbalance in the rates of diffusion. The relatively large dark spots 1' in the tungsten parts are particles of thorium oxide, not voids. FIG. 4 is a similar view of the same joint, after etching with 50% $NH_4OH$—50% $H_2O_2$ to bring out the microstructure.

It will be apparent from a comparison of the figures that the thoriated-tungsten joints produced in accordance with my invention (FIGS. 3 and 4) are superior to those obtained by diffusion bonding with conventional tantalum foil (FIGS. 1 and 2). Not only are the joints shown in FIGS. 3 and 4 substantially free from weakening Kirkendall voids, but they also are hardened by virtue of the dispersion of $Ta_2C$ particles. Moreover, such dispersions in refractory metals lower their ductile-to-brittle transition temperature and thereby toughen them.

Although my method accomplishes dispersion hardening, it should be understood that it is not limited to dispersion-hardening applications. That is, my method can be used to produce diffusion-bonded joints essentially free from Kirkendall voids in various applications where dispersion hardening is of no interest or of no appreciable benefit.

As stated previously, my method is applicable to the diffusion-bonding of refractory metals—tungsten, tantalum, rhenium, columbium, and molybdenum—and alloy combinations thereof. Some of the materials systems to which this method for reducing Kirkendall void formation is applicable are listed in the following table. The table lists various refractory metal or alloy parts, indicating for each a suitable matrix-and-dispersion combination for use as the intermediate. The parts shown in the table as W—W, for example, can be tungsten metal, dispersion-hardened tungsten, or tungsten alloys. As mentioned, conventional techniques may be used to fabricate the intermediates listed.

Table

| Parts To Be Joined | Intermediate Matrix | Dispersion |
|---|---|---|
| W—W | Ta | $Ta_2C$ or $ThO_2$ |
| W—W | Rh | $ThO_2$ or HfC |
| W—W | Mo | $ThO_2$ |
| Nb—Nb | Zr | ZrC or $ThO_2$ |
| Mo—Mo | Ta | $Ta_2C$ or $ThO_2$ |
| Mo—Mo | V | $ThO_2$ |

In each of the materials systems listed above, diffusion bonding can be accomplished satisfactorily using about the same time, temperature, and pressure as are used to bind the same materials with an intermediate containing the indicated matrix metal without a dispersion. In each instance, a reduction in Kirkendall voids is obtained in high-temperature service or during bonding when joining. The matrix materials listed are merely representative of those known in the diffusion-bonding art to be useful as intermediates. The materials listed for the dispersions are not the only ones which can be used but are merely specific illustrations of particulates meeting the criteria set forth previously herein. Beryllium oxide and magnesium oxide are further examples.

In the preceding detailed example, the dispersion is formed in situ by chemical reaction during the bonding operation. Another example of a dispersion formed in situ is the diffusion-bonding of niobium parts, using an intermediate consisting of colloidal carbon ball-milled into fine zirconium metal powder. During bonding, the very refractory and stable ZrC carbide forms by chemical reaction. Zirconium metal as an intermediate is metallurgically compatible with niobium and, further, serves to dissolve any contaminating oxides on the faying surfaces during bonding.

What is claimed is:

1. In a diffusion-bonding process wherein an intermediate is interposed between faying surfaces of a refractory material selected from the group consisting of tungsten, tantalum, rhenium columbium, molybdenum, and alloy combinations thereof and wherein the resulting assembly is maintained at an elevated temperature and under pressure in a non-oxidizing atmosphere to effect coalescence of said intermediate and said surfaces, said intermediate being more deformable than said surfaces and consisting at least in part of a metallic component which at said temperature diffuses into said material at a faster rate than said material diffuses into said component, the improvement comprising incorporating in said component a dispersion of ultrafine particles which at said temperature are chemically and physically stable and substantially non-reactive and non-coherent with said component, said particles and said component being essentially mutually insoluble.

2. The process of claim 1 wherein said dispersion is incorporated in said component prior to interposition of said intermediate between said surfaces.

3. The process of claim 1 wherein said dispersion is formed in situ in said component in the course of the diffusion bonding operation by a heat-initiated chemical reaction between said component and a material dispersed therein.

4. The method of claim 1 wherein said dispersion consists of particles having an average diameter in the range of about 0.05 micron to 1.0 micron.

5. The method of claim 4 wherein said dispersion consists of particles having an average interparticle spacing in the range of about 0.2 to 2.0 microns.

6. The method of claim 1 wherein said component is a metallic material selected from the group consisting of tantalum, rhenium, molybdenum, zirconium, and vanadium, and alloy combinations thereof.

7. The method of claim 1 wherein said particles consist essentially of a high-melting-point compound selected from the group consisting of tantalum carbide, hafnium carbide, zirconium carbide, thorium oxide, beryllium oxide, and magnesium oxide.

* * * * *